US009589133B2

United States Patent
Ben-Haim

(10) Patent No.: US 9,589,133 B2
(45) Date of Patent: Mar. 7, 2017

(54) PREVENTING RETURN-ORIENTED PROGRAMMING EXPLOITS

(71) Applicant: International Business Machines Corporation, Armonk, NY (US)

(72) Inventor: Eldan Ben-Haim, Kiryat Ono (IL)

(73) Assignee: International Business Machines Corporation, Armonk, NY (US)

(*) Notice: Subject to any disclaimer, the term of this patent is extended or adjusted under 35 U.S.C. 154(b) by 99 days.

(21) Appl. No.: 14/454,862

(22) Filed: Aug. 8, 2014

(65) Prior Publication Data

US 2016/0042177 A1 Feb. 11, 2016

(51) Int. Cl.
*G06F 21/54* (2013.01)

(52) U.S. Cl.
CPC ........ *G06F 21/54* (2013.01); *G06F 2221/033* (2013.01)

(58) Field of Classification Search
CPC ........ G06F 21/54; G06F 21/56; G06F 21/566; G06F 2221/033
USPC ...................................................... 726/22–25
See application file for complete search history.

(56) References Cited

U.S. PATENT DOCUMENTS

| 8,819,822 B1* | 8/2014 | Pike ..................... G06F 21/562 726/22 |
| 2004/0168078 A1* | 8/2004 | Brodley ................ G06F 21/52 713/190 |
| 2006/0095895 A1* | 5/2006 | K. ........................ G06F 11/28 717/130 |
| 2007/0240215 A1* | 10/2007 | Flores .................... G06F 21/55 726/24 |
| 2008/0256301 A1* | 10/2008 | Liardet ................. G06F 21/54 711/125 |
| 2013/0117843 A1* | 5/2013 | Komaromy ........... G06F 21/52 726/22 |
| 2014/0052971 A1* | 2/2014 | Sehr ................... G06F 9/30003 712/227 |
| 2014/0380468 A1* | 12/2014 | Gerzon ................ G06F 21/52 726/22 |

(Continued)

OTHER PUBLICATIONS

Vasileios P. Kemerlis et al, kGuard: Lightweight Kernel Protection against Return-to-user Attacks, ACM, 2012.*

*Primary Examiner* — Shanto M Abedin
(74) *Attorney, Agent, or Firm* — Christopher McLane; Maeve M. Carpenter

(57) ABSTRACT

Preventing return-oriented programming exploits by identifying a set of contiguous computer software instructions extending from a first location within a computer memory to a second location within the computer memory, where the set of computer software instructions includes a return-oriented programming gadget, copying the set of computer software instructions to extend from a third location within the computer memory to a fourth location within the computer memory, placing a branching instruction at the first memory location, where the branching instruction branches to the third location, appending a return branching instruction to the copy of the set of computer software instructions, where the return branching instruction branches to a fifth location within the computer memory that immediately follows the second location, and overwriting at least a portion of the return-oriented programming gadget between the first location and the second location.

14 Claims, 4 Drawing Sheets

(56) References Cited

U.S. PATENT DOCUMENTS

| | | | | |
|---|---|---|---|---|
| 2015/0095617 A1* | 4/2015 | Shanbhogue | ......... | G06F 9/3004 |
| | | | | 712/208 |
| 2015/0186296 A1* | 7/2015 | Guidry | ................ | G06F 21/54 |
| | | | | 713/193 |
| 2015/0324585 A1* | 11/2015 | Teuwen | ............... | G06F 21/56 |
| | | | | 726/22 |

* cited by examiner

PREVENTING RETURN-ORIENTED PROGRAMMING EXPLOITS

BACKGROUND

Some types of computer attacks operate by exploiting valid code sequences in software programs without injecting any new executable code into computer memory, whereby small snippets of valid code sequences, often referred to as return-oriented programming (ROP) gadgets, may be found by the attacker and strung together to form new malicious code sequences. As a ROP exploit must locate the code to be executed, which requires knowledge of the memory address of the code, techniques such as Address Space Layout randomization (ASLR) have been developed whereby code modules are randomly relocated within a computer process's memory address space in order to make it more difficult for a ROP exploit to predict the location of a ROP gadget. Unfortunately, not all code modules are amenable to ASLR, while those that are may have their locations discovered by an attacker, such as by accessing data whose location is known and fixed relative to the start address of a relocated code module, whereupon the attacker may again predict the location of any ROP gadgets they may contain.

SUMMARY

In one aspect of the invention a method is provided for preventing return-oriented programming exploits, the method including identifying a set of contiguous computer software instructions extending from a first location within a computer memory to a second location within the computer memory, where the set of computer software instructions includes a return-oriented programming gadget, copying the set of computer software instructions to extend from a third location within the computer memory to a fourth location within the computer memory, placing a branching instruction at the first memory location, where the branching instruction branches to the third location, appending a return branching instruction to the copy of the set of computer software instructions, where the return branching instruction branches to a fifth location within the computer memory that immediately follows the second location, and overwriting at least a portion of the return-oriented programming gadget between the first location and the second location.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
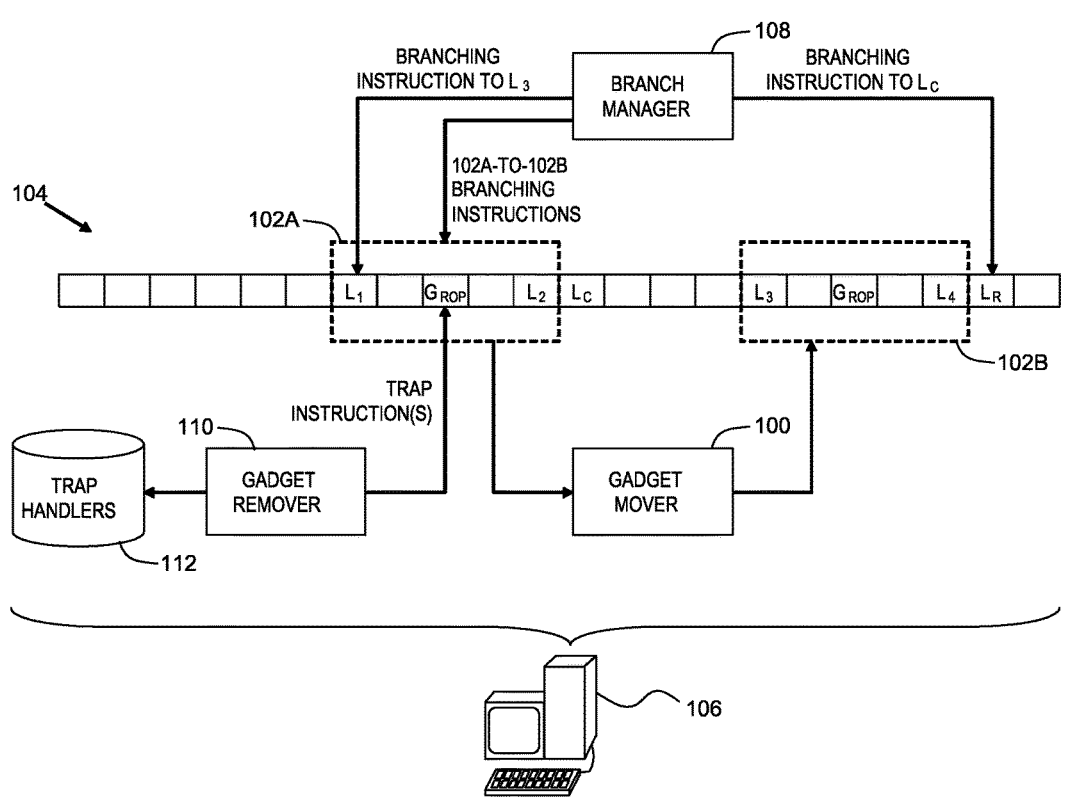
FIG. 1 is a simplified conceptual illustration of a system for preventing return-oriented programming exploits, constructed and operative in accordance with an embodiment of the invention.

Embodiments of the present invention may include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a simplified conceptual illustration of a computer security system for preventing return-oriented programming exploits on a computer, constructed and operative in accordance with an embodiment of the invention. In the system of FIG. 1 a gadget mover 100 is configured to identify a set 102A of contiguous computer software instructions of a computer software application within a computer memory 104, such as of a computer 106, where set 102A extends from a first location $L_1$ within computer memory 104 to a second location $L_2$ within computer memory 104, and where set 102A of computer software instructions includes a return-oriented programming (ROP) gadget $G_{ROP}$, which gadget mover 100 is configured, in accordance with conventional techniques, to identify as being a ROP gadget. In one embodiment, set 102A is identified such that each computer software instruction in set 102A includes at least a portion of ROP gadget $G_{ROP}$, although if the start of the first instruction in set 102A coincides with the start of the ROP gadget $G_{ROP}$, set 102A is identified such that it includes one or more instructions immediately preceding the ROP gadget $G_{ROP}$.

Gadget mover 100 is configured to copy set 102A of computer software instructions to extend from a third location $L_3$ within computer memory 104 to a fourth location $L_4$ within computer memory 104, where the copy of set 102A is referred to herein as copy set 102B.

A branch manager 108 is configured to place a branching instruction at $L_1$, where the branching instruction causes execution flow of the computer software application to branch to $L_3$ when the execution flow reaches $L_1$. Branch manager 108 is also configured to append a branching instruction to copy set 102B at a memory location $L_R$ that immediately follows memory location $L_4$ within computer memory 104, where this branching instruction, also referred to herein as a return branching instruction, causes execution flow of the computer software application to branch to a memory location $L_C$ when the execution flow reaches $L_R$, where $L_C$ immediately follows $L_2$ within computer memory 104, whereupon the execution flow continues from $L_C$. Branch manager 108 is optionally configured to replace any branching instruction that branches to any location between $L_1$ and $L_2$ with a branching instruction that branches to a corresponding location between $L_3$ and $L_4$.

A gadget remover 110 is configured to overwrite some, and preferably all, of ROP gadget $G_{ROP}$ between the $L_1$ and $L_2$, such as with one or more trap instructions for which gadget remover 110 configures one or more corresponding trap handlers 112 to perform one or more computer-security-related actions when an attempt is made to execute a trap instruction, such as by terminating the execution of the computer software application within whose instructions the trap instruction was inserted, and/or providing a computer-security-related notification reporting the activity, such as to a user or administrator of the computer where the computer software application is executed. Gadget remover 110 optionally configures any trap handler 112 of any corresponding trap instruction to identify an execution path to the trap instruction when an attempt is made to execute the trap instruction, determine that the execution path is consistent with unauthorized execution, and perform the computer-security-related action(s) responsive to determining that the execution path is consistent with unauthorized execution. For example, if the instruction executed prior to the branch to the trap instruction was a 'function return' instruction, but the original code that the trap instruction replaced is not a 'function call' instruction, trap handler 112 may conclude that the execution path to the trap instruction is consistent with unauthorized execution. Similarly, trap handler 112 may consider branches to the trap instructions that originate from a different code module to be consistent with unauthorized execution.

Any of the elements shown in FIG. 1 are preferably implemented by one or more computers, such as by computer 106, in computer hardware and/or in computer software embodied in a computer-readable storage medium in accordance with conventional techniques.

Figure 2:
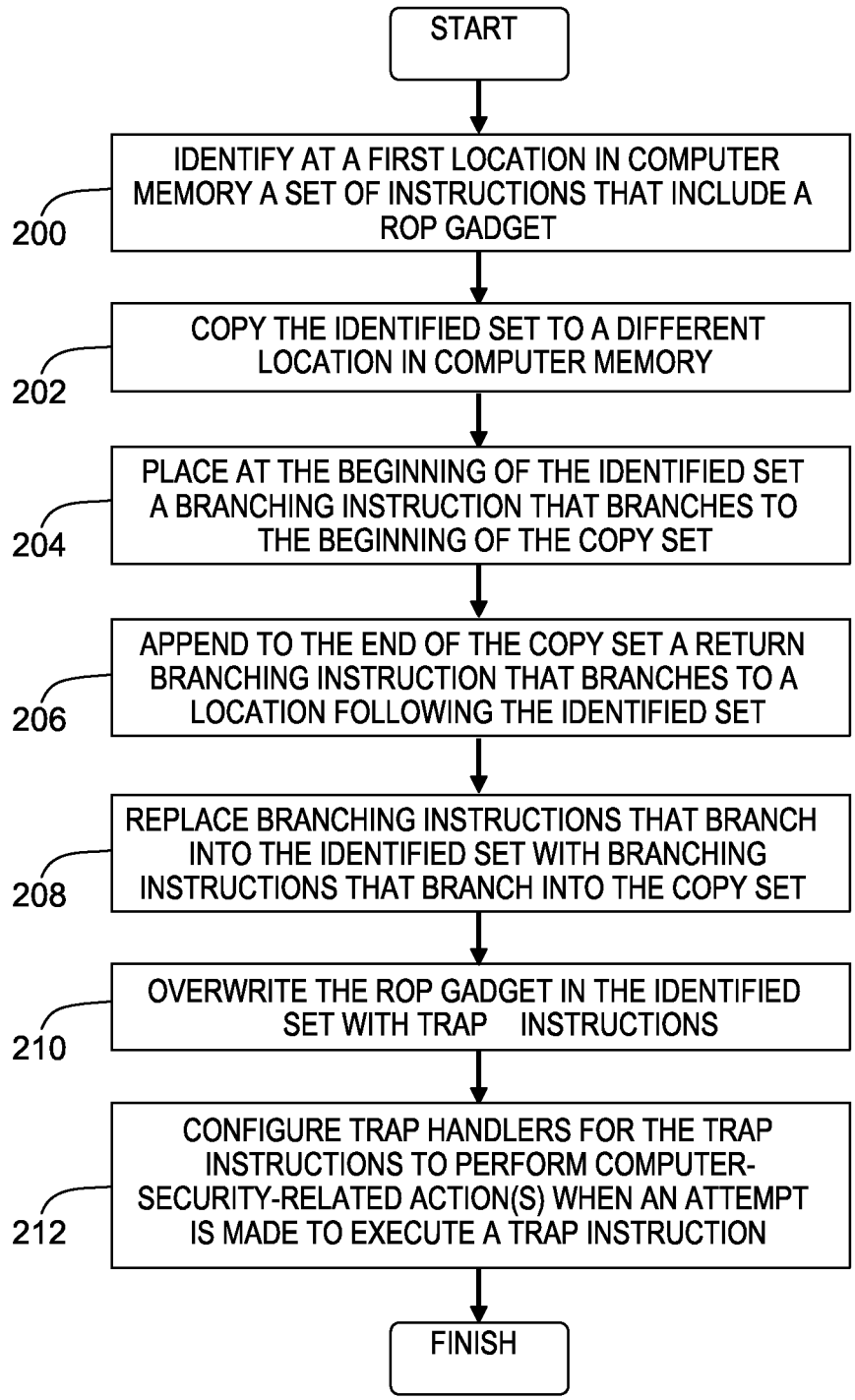
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, a set of contiguous computer software instructions of a computer software application is identified at a first location within a computer memory as including a return-oriented programming (ROP) gadget (step 200). The set is copied to a different location within the computer memory (step 202). A branching instruction is placed at the beginning of the identified set within the computer memory, where the branching instruction causes execution flow of the computer software application to branch to the beginning of the copy set when the execution flow reaches the branching instruction (step 204). A return branching instruction is appended to the end of the copy set, where the return branching instruction causes execution flow of the computer software application to branch to a memory location immediately following the identified set within the computer memory when the execution flow reaches the return instruction (step 206). Any branching instruction that branches to any location within the identified set is replaced with a replacement branching instruction that branches to a corresponding location within the copy set (step 208). Some, and preferably all, of the ROP gadget in the identified set is overwritten, such as with one or more trap instructions (step 210) for which corresponding trap handlers are configured to perform one or more computer-security-related actions when an attempt is made to execute a trap instruction (step 212), such as by terminating the execution of the computer software application within whose instructions the trap instruction was inserted, and/or providing a computer-security-related notification reporting the activity, such as to a user or administrator of the computer where the computer software application is executed.

Figure 3:
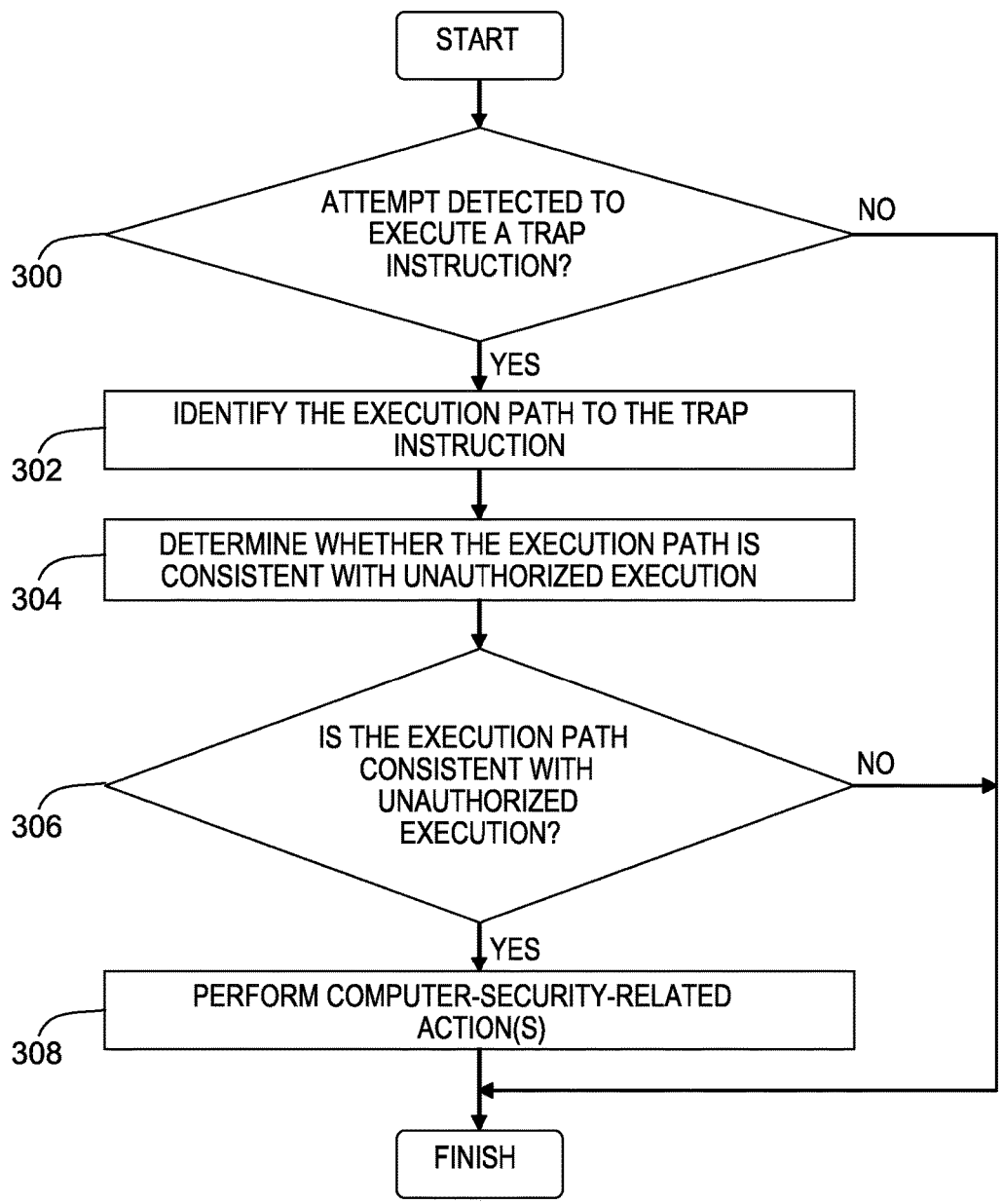
FIG. 3 is a simplified flowchart illustration of an exemplary method of operation of the system of FIG. 1, operative in accordance with an embodiment of the invention.

Reference is now made to FIG. 3 which is a simplified flowchart illustration of an exemplary method of operation of the system of FIG. 1, operative in accordance with an embodiment of the invention. In the method of FIG. 3, any trap handler that corresponds to a trap instruction is configured to operate as follows. If an attempt is made to execute a trap instruction (step 300), an execution path to the trap instruction is identified (step 302), and it is determined whether the execution path is consistent with unauthorized execution (step 304). If the execution path is consistent with unauthorized execution (step 306), one or more computer-security-related action(s) are performed (step 308), such as are described hereinabove. If there is no attempt made to execute a trap instruction (step 302, "no" branch), or if the execution path is not consistent with unauthorized execution (step 306, "no" branch), the method of operation finishes processing.

Figure 4:
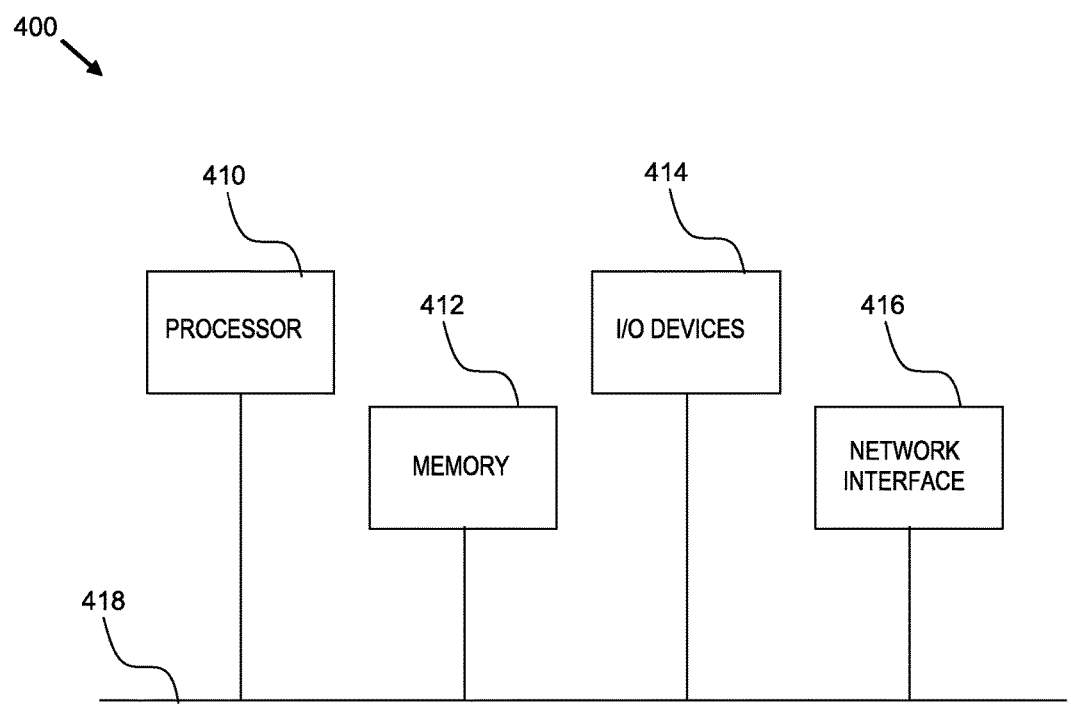
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer security method comprising:
   identifying a set of contiguous computer software instructions extending from a first location within a computer memory to a second location within the computer memory, wherein the set of contiguous computer software instructions includes a return-oriented programming gadget;
   copying the set of contiguous computer software instructions to extend from a third location within the computer memory to a fourth location within the computer memory;
   placing a branching instruction at the first location, wherein the branching instruction branches to the third location;
   appending a return branching instruction to the copy of the set of contiguous computer software instructions, wherein the return branching instruction branches to a fifth location within the computer memory that immediately follows the second location;
   overwriting at least a portion of the return-oriented programming gadget between the first location and the second location, wherein overwriting comprises overwriting with at least one trap instruction; and
   configuring a trap handler for the trap instruction to perform a computer-security-related action.

2. The method of claim 1 wherein the identifying comprises identifying wherein each computer software instruction in the set of contiguous computer software instructions includes at least a portion of the return-oriented programming gadget.

3. The method of claim 1 further comprising configuring the trap handler to:

identify an execution path to the trap instruction;
determine that the execution path is consistent with unauthorized execution; and
perform the computer-security-related action responsive to determining that the execution path is consistent with unauthorized execution.

4. The method of claim 1 further comprising replacing any branching instruction that branches to any of a location between the first location and the second location with a replacement branching instruction that branches to a corresponding location between the third location and the fourth location.

5. The method of claim 1 wherein the identifying, copying, placing, appending, and overwriting are implemented in any of:
   a) computer hardware; and
   b) computer software embodied in a computer readable storage medium.

6. A computer security system comprising:
   one or more computer processors;
   one or more computer readable storage media;
   program instructions stored on the computer readable storage media for execution by at least one of the one or more computer processors, the program instructions comprising:
   identify a set of contiguous computer software instructions extending from a first location within a computer memory to a second location within the computer memory, wherein the set of contiguous computer software instructions includes a return-oriented programming gadget;
   copy the set of contiguous computer software instructions to extend from a third location within the computer memory to a fourth location within the computer memory;
   place a branching instruction at the first location, wherein the branching instruction branches to the third location; and
   append a return branching instruction to the copy of the set of contiguous computer software instructions, wherein the return branching instruction branches to a fifth location within the computer memory that immediately follows the second location;
   overwrite at least a portion of the return-oriented programming gadget between the first location and the second location, wherein overwriting comprises overwriting with at least one trap instruction; and
   configuring a trap handler for the trap instruction to perform a computer-security-related action.

7. The system of claim 6 wherein each computer software instruction in the set of contiguous computer software instructions includes at least a portion of the return-oriented programming gadget.

8. The system of claim 6 wherein the trap handler is configured to
   identify an execution path to the trap instruction;
   determine that the execution path is consistent with unauthorized execution; and
   perform the computer-security-related action responsive to determining that the execution path is consistent with unauthorized execution.

9. The system of claim 6 wherein a branch manager is configured to replace any branching instruction that branches to any of a location between the first location and the second location with a replacement branching instruction that branches to a corresponding location between third location and the fourth location.

10. The system of claim 6 wherein a gadget mover, a branch manager, and a gadget remover are implemented in any of:
    a) computer hardware; and
    b) computer software embodied in a computer readable storage medium.

11. A computer program product for computer security, the computer program product comprising:
    a computer readable storage medium; and
    computer readable program code embodied in the computer readable storage medium, wherein the computer readable program code is configured to:
    identify a set of contiguous computer software instructions extending from a first location within a computer memory to a second location within the computer memory, wherein the set of contiguous computer software instructions includes a return-oriented programming gadget;
    copy the set of contiguous computer software instructions to extend from a third location within the computer memory to a fourth location within the computer memory;
    place a branching instruction at the first location, wherein the branching instruction branches to the third location;
    append a return branching instruction to the copy of the set of contiguous computer software instructions, wherein the return branching instruction branches to a fifth location within the computer memory that immediately follows the second location;
    overwrite at least a portion of the return-oriented programming gadget between the first location and the second location, wherein overwriting comprises overwriting with at least one trap instruction; and
    configuring a trap handler for the trap instruction to perform a computer-security related action.

12. The computer program product of claim 11 wherein each computer software instruction in the set of contiguous computer software instructions includes at least a portion of the return-oriented programming gadget.

13. The computer program product of claim 11 wherein the trap handler is configured to
    identify an execution path to the trap instruction;
    determine that the execution path is consistent with unauthorized execution; and
    perform the computer-security-related action responsive to determining that the execution path is consistent with unauthorized execution.

14. The computer program product of claim 11 wherein the computer readable program code is configured to replace any branching instruction that branches to any of a location between the first location and the second location with a replacement branching instruction that branches to a corresponding location between third location and the fourth location.

* * * * *